United States Patent
Mani et al.

(10) Patent No.: US 11,712,854 B2
(45) Date of Patent: Aug. 1, 2023

(54) SYSTEM AND METHOD FOR DETECTING ERRORS DURING 3D PRINTING

(71) Applicant: Xerox Corporation, Norwalk, CT (US)

(72) Inventors: Karthik Mani, Chennai (IN); Gautham Sukumar, Chennai (IN); Prasanth Kalaiselvan, Mayiladuthurai (IN); Nilesh Jayapandian Nadar, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/467,843

(22) Filed: Sep. 7, 2021

(65) Prior Publication Data

US 2023/0070946 A1 Mar. 9, 2023

(51) Int. Cl.
*B29C 64/393* (2017.01)
*B33Y 30/00* (2015.01)
*B29C 64/118* (2017.01)
*B33Y 50/02* (2015.01)
*B29C 64/236* (2017.01)
*B29C 64/209* (2017.01)

(52) U.S. Cl.
CPC .......... *B29C 64/393* (2017.08); *B29C 64/118* (2017.08); *B29C 64/209* (2017.08); *B29C 64/236* (2017.08); *B33Y 30/00* (2014.12); *B33Y 50/02* (2014.12)

(58) Field of Classification Search
CPC .......... B29C 64/386–393; B28B 1/001; B33Y 50/00–02
See application file for complete search history.

(56) References Cited

U.S. PATENT DOCUMENTS

| | | | |
|---|---|---|---|
| 5,793,901 A | 8/1998 | Matsutake et al. | |
| 2016/0144564 A1* | 5/2016 | Padgett | B29C 64/209 425/113 |
| 2019/0193156 A1* | 6/2019 | Yang | B33Y 30/00 |
| 2019/0263066 A1 | 8/2019 | Nystrom et al. | |
| 2020/0246119 A1* | 8/2020 | Long | B29C 64/20 |
| 2022/0410490 A1* | 12/2022 | Shishido | B33Y 10/00 |

OTHER PUBLICATIONS

Murphy, Charge-coupled device detector, https://radiopaedia.org/articles/charge-coupled-device-detector?lang=gb, Jul. 14, 2020 from Internet Archive (accessed Oct. 18, 2022) (Year: 2020).*

* cited by examiner

Primary Examiner — Matthew J Daniels
Assistant Examiner — Andrew L Swanson
(74) Attorney, Agent, or Firm — Maginot Moore & Beck LLP

(57) ABSTRACT

A three-dimensional (3D) printer includes a base plate and a nozzle connectable to a source of molten material and operable to eject the molten material onto the base plate that are movable in orthogonal directions to form a 3D object on the base plate. An error detection system detects a dislocation of the 3D object on the base plate during the 3D printing operation, which can lead to stopping the 3D printing process. The error detection system includes a beam emitter and a detector that work in conjunction with a tag formed on the 3D object to determine whether the object has dislocated.

10 Claims, 6 Drawing Sheets

SYSTEM AND METHOD FOR DETECTING ERRORS DURING 3D PRINTING

TECHNICAL FIELD

The system and method disclosed herein relate to printers that produce three-dimensional objects and, more particularly, to a device and method for detecting errors during printing by such printers.

BACKGROUND

Digital three-dimensional manufacturing, also known as digital additive manufacturing, is a process of making a three-dimensional solid object of virtually any shape from a digital data model. Three-dimensional printing is distinguishable from traditional object-forming techniques, which mostly rely on the removal of material from a work piece by a subtractive process, such as cutting or drilling. One method of 3-D printing is a process known as Fused Deposition Modeling (FDM). FDM printers use a polymer or thermoplastic filament, which is heated to its melting point and then extruded, layer by layer, to create a three-dimensional object. Another method, known as Fused Filament Fabrication (FFF) printing is an additive process in which one or more material applicators extrude polymer filament to form successive layers of material on a substrate in different shapes. It is understood that other materials may be used in the FDM or FFF priming processes, such as certain metals.

In either process, a polymer filament is typically unwound from a coil and fed into the material applicator to provide material for a layer. The layer is supported on a platform or base plate, and one or more material applicators are operatively connected to one or more actuators for controlled movement of the material applicators and/or base plate relative to each other to produce the layers that form the object. The material applicators are typically moved vertically and horizontally relative to the platform via a numerically controlled mechanism to position the nozzle along orthogonal axes, i.e., at x-, y-, and z-dimension coordinates, before depositing the material on the substrate. In alternative embodiments, the platform is moved relative to the material applicators, at least in the z-direction.

One method for producing three-dimensional objects with a FDM or a FFF printing system 10 is illustrated in FIGS. 5A-5D. As shown in FIG. 5A, during a printing operation, a material applicator 14 is positioned relative to a base plate 18 to space the material applicator 14 vertically above the base plate 18 in the z-dimension by a height H. As the material applicator 14 is driven in the x-dimension relative to the base plate 18, the material applicator 14 deposits a first layer 22 of material 26 having a length L (shown in FIG. 5B) on the base plate 18.

The material 26 is fed into the material applicator 14 as a filament 38 that is heated by a melter 42 of the material applicator 14. The melter 42 heats the filament 38 to a temperature that increases the pliability of the polymer of the filament material 26. Typically, the polymer of the filament material 26 is a thermoplastic, which is a material that is pliable above a certain temperature, referred to hereinafter as a "transition temperature," and acts as a solid below the transition temperature.

When the melter 42 heats the thermoplastic polymer of the filament material 26 above the transition temperature, the material 26 is selectively extrudable. After being heated by the melter 42, the extrudable material 26 is deposited on the base plate 18 by a nozzle 46 of the material applicator 14. After being deposited by the nozzle 46, the material 26 cools on the base plate 18 to a temperature below the transition temperature such that the layer 22 becomes less pliable and more viscous and acts as a solid.

As shown in FIG. 5B, after the layer 22 of material 26 is deposited on the base plate 18, the material applicator 14, or alternatively the base plate 18, is driven in the z-dimension to re-position the material applicator 14 at the height H above the layer 22. Re-positioning the material applicator 14 in the z-dimension accommodates the thickness T of the layer 22 atop the base plate 18 to prevent the material applicator 14 from contacting the layer 22 during subsequent passes in the x-dimension. After re-positioning in the z-dimension, the material applicator 14 is again driven in the x-dimension to deposit another layer 30 of the object 34 on top of the layer 22. The material applicator 14 can be driven in the x-dimension to pass the member 18 in the same direction or in the opposite direction as the previous pass. If the material applicator 14 is driven in the same direction, the material applicator 14 is also re-positioned in the x-dimension before depositing As shown in FIGS. 5C-5D, the material applicator 14 is also driven in the y-dimension in the same manner as described above with respect to the x-dimension. Accordingly, the material applicator 14 also deposits material 26 to define a width W of the object 34 on the base plate 18. The material applicator 14 can define the width W of the object 34 either by depositing the material 26 on the base plate 18 in layers with each layer having the width W in the y-dimension (shown in FIG. 5C) or by depositing multiple layers on the base plate 18 in the x-dimension to make up the width W in the y-dimension (shown in FIG. 5D). In some printing systems, the material applicator 14 can be driven in a direction having components in both the x-dimension and the y-dimension. Since the three-dimensional object printing process is an additive process, material 26 is repeatedly added to the object 34, and the thickness T of the object 34 increases throughout the process. This process can be repeated as many times as necessary to form the object 34. It is understood that the system 10 is exemplary of a 3D printing system suitable for use with the system and method for detecting errors in 3D printing disclosed herein.

The movement of the nozzle 46 in the illustrated example, and/or the movement of the base plate 18, is controlled by a mechanism capable of moving the nozzle (and/or base plate) in orthogonal (x-, y- and z-) directions as described above. Movement in the z-direction is generally uniform throughout the 3D printing process since it is based on the desired height H of the nozzle as the thickness T of the newly-formed object increases. The direction and distance of movements in the x- and y-directions are determined by the shape of the object 34 being created by the 3D printer 10. The movement mechanism typically includes a motor for each direction of movement, with each motor, or at least the motors for the x- and y-directions, controlled by an electronic printer controller.

The printer controller is configured to control the operation of the components of the 3D printer necessary to generate a physical embodiment of a 3D model. The 3D model can be created using known CAD software. Translation software takes the 3D CAD model and translates the CAD model data into a data set can be understood by the controller of the 3D printer system 10 to operate the components of the 3D printer to give physical form to the original 3D model. The translation software includes slicing software that digitally cuts the CAD model into flat layers that are printed one layer at a time by the printer controller.

In some cases, the translation software is integrated into the CAD software or into the printer controller. It can be appreciated that the nature of the data set produced by the translation software is dependent on the 3D printer controller and on the type and form of data that is read and understood by the 3D printer controller to control the operation of the movement mechanism and the material applicator. The translation software can be configured to allow a user to choose how the 3D printer operates to complete the object, such as by selecting various parameters like raft, layer height and in-fill properties.

In current FFF or FDM printers, adhesion of the initial layer to the base plate is critical. In other words, referring to FIG. 5A, the first layer 22 is expected to adhere sufficiently to the base plate 18 so that the first layer does not dislodge and shift during application of the subsequent layers. The software controlling the 3D printer moves the nozzle 46 and controls the flow of material through the applicator 14 based on a coordinate system that is fixed in relation to the printer and base plate. If the first layer shifts, the 3D printer will continue to apply subsequent layers according to the fixed coordinate system, unaware that the previously applied layers might have shifted. The result is a print failure, as depicted in FIG. 6 in which the object on the right is the desired 3D shape, while the object on the left is a result of a dislocation and shift of the object from the base plate. The dislocated object on the left of FIG. 6 must be scrapped and a new attempt to print the 3D object is required. The print failure wastes filament material and time, and can create a risk of occluding or clogging the nozzle 46.

It is known that dislocation of the object from the base plate can occur at any point in the 3D printing process. There is a need for an improvement to the 3D printing system and method that allows early detection of a potential print failure.

SUMMARY

A three-dimensional (3D) printer includes a base plate, a nozzle connectable to a source of molten material and operable to eject the molten material onto the base plate, and a 3D movement mechanism moving the components along orthogonal axes to form a 3D object on the base plate. As long as the object remains stationary on the base plate, the resulting printed object will accurately reflect the 3D model. However, if the object dislocates from the base plate during printing, continued 3D printing will result in an object that is deformed relative to the 3D model. An error detection system is provided that is configured and operable to detect a dislocation of the 3D object on the base plate. A printer controller operable to control the nozzle and the 3D movement mechanism according to a 3D model to perform a 3D printing operation to form a 3D object on the base plate, can terminate or pause the printing process when an error is detected.

In one embodiment, the error detection system includes an emitter for emitting a beam and a detector for detecting the beam. The emitter and detector are arranged relative to the base plate so that the emitter and detector are aligned with each other along an axis of the base plate so that the beam emitted by the emitter passes across the base plate and is detectable by the detector. The 3D model for the object is modified to print a tag attached to the 3D object as it is being printed. The tag is offset along the axis from the 3D object and maintains a fixed position along that axis as long as the 3D object is properly positioned on the base plate. The tag is positioned to intersect the beam and prevent its transmission from the emitter to the detector. However, if the object becomes dislocated on the base plate, the tag moves from its fixed position and at least a portion of the beam is transmitted to and detected by the detector. Reception of the beam by the detector triggers the error detection so that the 3D printing process is terminated or paused.

The tag can be optionally added to any model of a 3D object to be printed. The tag is connected to the 3D object by a bridge element that is configured to be easily severed to allow removal of the tag from the finished 3D object. The tag is offset by a distance sufficient so that the 3D object does not interfere with the beam from the emitter during normal printing operation or after dislodgement or dislocation on the base plate.

DETAILED DESCRIPTION

Figure 1:
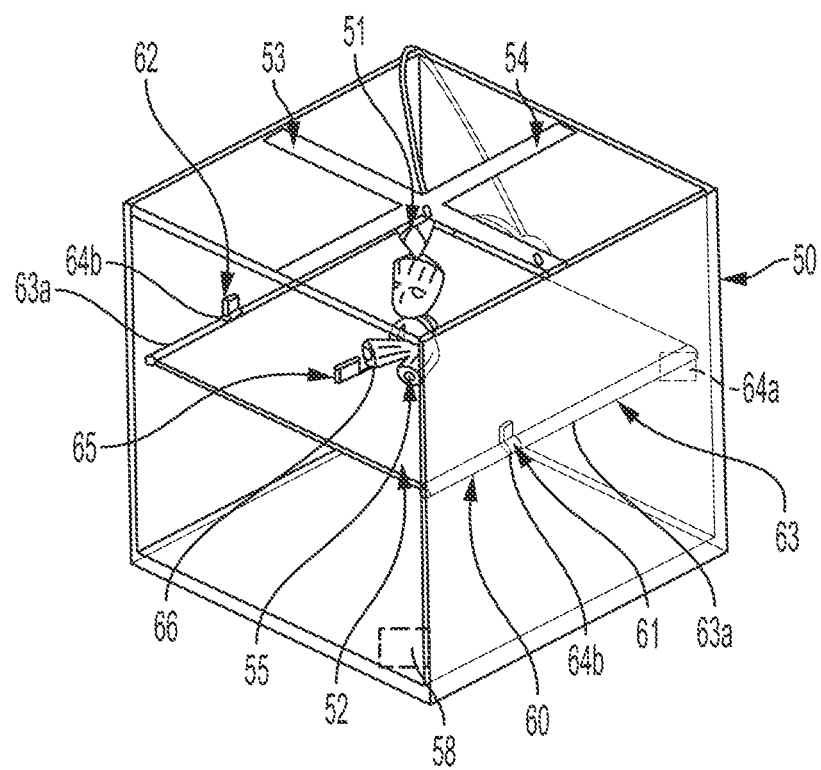
FIG. 1 is a representation of a 3D printing machine for printing a 3D object incorporating the system and method of the present disclosure.

For a general understanding of the environment for the inkjet printer and its operation as disclosed herein, reference is made to the drawings. In the drawings, like reference numerals designate like elements.

A 3D printer 50 of FIG. 1 can be configured like the printing machine 10 of FIGS. 5A-5D, including a nozzle 51 for dispensing the extruded filament onto a base plate 52. Of course, other 3D printer configurations are contemplated. X-axis and y-axis movement mechanisms 52, 53 move the nozzle according to a pre-programmed model to form the object 55, as described above. It is understood that the 3D printer includes other components for feeding molten material to the nozzle, such as the components of printer 10, but these components are not shown in FIG. 1 for clarity. It is also understood that the base plate 52 of the printer 50 can be configured to move in the z-axis direction, or in the x-, y- and z-axis directions with the nozzle remaining stationary. Ultimately, the 3D printer 50 is configured for relative movement of the nozzle and base plate in orthogonal x-, y- and z-directions as needed to perform the 3D printing operation, whether it is by movement of one or both components.

Figure 6:
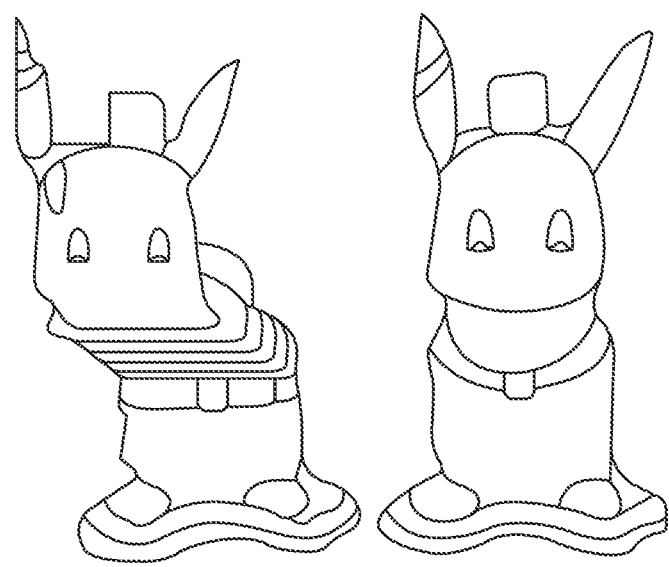
FIG. 6 is a picture of a properly printed 3D object (on the right) compared to a 3D object resulting from a printer failure (on the left) in which the object was dislocated from the base plate of the printer during the 3D printing operation.

In accordance with the present disclosure, the 3D printer 50 includes an error detection system 60 that is operable to detect when the object 55 has dislodged and dislocated on the base plate 52, such as the dislocated object shown in FIG. 6. The error detection system includes a beam emitter 61 and a beam detector 62 facing the emitter. The emitter and detector are aligned with each other on one of the x- or y-axes. In the illustrated embodiment, the emitter and detector are aligned along the y-axis. The emitter and detector are oriented relative to each other so that a beam generated by the emitter can be received by the detector. In one embodiment, the emitter and detector can be manually positioned along the y-axis (or x-axis). However, optimally, a positioning mechanism 63 is provided to jointly move the emitter and detector to a pre-determined position along the y-axis (or x-axis). The positioning mechanism can be fixed within the housing of the 3D printer or fixed on the base plate, particularly when the base plate is moved in the vertical z-axis in lieu of vertical movement of the nozzle 51 or when the base plate is moved in three dimensions relative to a stationary nozzle. The emitter 61 and detector 62 are mounted on the positioning mechanism 63 in a suitable manner so that the two components can move in unison while maintaining their orientation relative to each other. In one embodiment, the positioning mechanism can include a lead screw 63a driven by a motor 64a for each of the emitter and detector, with the emitter and detector mounted on a driven nut 64b carried by the respective lead screw, with the lead screw and driven nut being of known design. The motors of the two lead screws can be synchronized so that the emitter and detector move in unison by the same distance. To that end, the motors can be stepper motors capable of controlled step-wise rotation of the lead screws. Alternatively, a single motor can drive both lead screws with appropriate gearing.

As a further alternative, the emitter and detector can be mounted on a common carriage that supports the two components on opposite sides of the base plate. In this alternative, the carriage can include the driven nuts 64b in FIG. 1 with a bar (not shown) extending beneath the base plate 52 connecting the two elements 64b. Only one lead screw 63a is required in this alternative embodiment to drive one of the nuts 64b. The emitter and detector are mounted on a corresponding driven nut 64b. In this alternative, a single motor drives the single lead screw to simultaneously move the emitter and detector to the desired position. Other positioning mechanisms are contemplated that provided for simultaneous identical movement of the emitter and detector.

The 3D printer 50 includes a controller 58 that is configured and operable to control and monitor the operation of the nozzle 51, axis movement mechanisms 53, 54 (and z-axis movement mechanism, not shown) and positioning mechanism 63. The controller includes firmware or software that is operable to control the operation of the 3D printer components to generate the 3D object 55 according to the user-input data, which can be input directly into the 3D printer in a known manner or obtained from a data set generated by the translation software, as described above. The controller 58 is configured and operable to cease the 3D printing process under certain conditions, such as by user command or by detecting an error condition in the filament or nozzle.

In another feature of the disclosure, the object 55 is provided with a detection feature 65 which can be in the form of a tag that is integral with at least the first layer (such as layer 22 in FIG. 5A) of the object when it is generated by the 3D printer 50. In one embodiment, the tag 65 can be rectangular and is printed by the 3D printer to extend vertically (along the z-axis) at a pre-determined position along the y-axis (or x-axis, depending on the orientation of the emitter and detector). The tag 65 is connected to the object 55 by a bridge element 66 that is thin enough to be easily broken off from the object in order to remove the tag.

As shown in FIG. 1, the tag 65 is arranged on the base plate 53 along the y-axis to correspond with the y-axis position of the emitter 61 and detector 62. More precisely, the emitter and detector are moved by the positioning mechanism 63 so that they are aligned with the tag once the tag is formed by the 3D printer. The tag is thus interposed directly in the line of sight between the emitter 61 and detector 62. The emitter 61 is operable to transmit a beam B (FIG. 2) across the base plate 52 to be received by the detector 62. The tag is offset from the object 55 a sufficient distance so that the emitter beam B does not strike the object when the emitter and detector are properly aligned. The offset is also sufficiently far that the object is not likely to be dislodged far enough to intersect the beam. In one embodiment, the tag is offset from the object by about 20 mm in the y-direction. The beam is not transmissible through the tag 65, or more precisely, the tag is formed of a material that is opaque to the beam. In one embodiment, the emitter 61 generates an optical beam that is sufficiently focused so that the beam is limited to the area of the tag 65. The tag can thus be formed of an opaque material, such as the thermoplastic used to form the object 55. When the tag intersects the beam, the tag prevents transmission of the beam past the tag to the detector. It can be appreciated that only a portion of the tag may intersect the beam when the 3D object, and thus the tag, are slightly offset from their intended position.

It can be appreciated that the dimensions of the tag are calibrated to be substantially equal dimensions, or diameter, of the beam generated by the emitter 61. Thus, for a beam diameter of 0.1 in., a rectangular tag 65 can have a height and width (in the y-direction in the example) of 0.1-0.11 in. The detector 62 is configured to generate a signal when any portion of the beam B impinges on the detector. In one example, the emitter 61 is a laser and the detector 62 is a photodetector, such as a charge-coupled device (CCD). The emitter is configured to generate a beam having a known area or diameter. The detector can be configured to generate a signal when less than the entire beam strikes the emitter. Thus, the detector can include an array of CCD capacitors corresponding to a plurality of pixels in the known area or diameter. Each pixel is configured to generate a signal in response to receiving the beam generated by the emitter.

Figure 2:
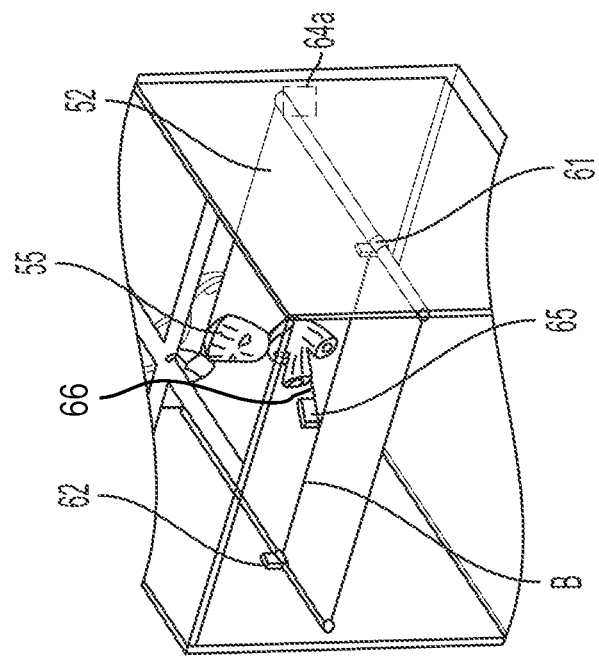
FIG. 2 is the representation of the 3D printing machine of FIG. 1, in which the 3D object is properly oriented within the machine during printing.
Figure 3:
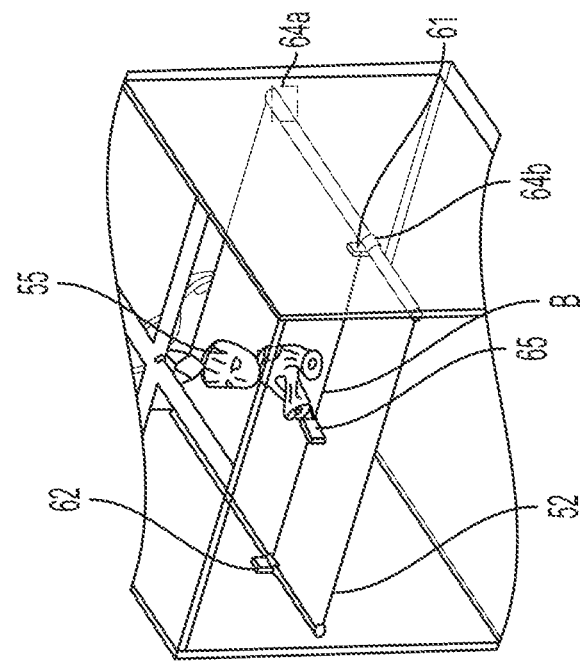
FIG. 3 is the representation of the 3D printing machine of FIG. 1, in which the 3D object is dislocated within the machine during printing.

As shown in FIG. 2, when the object 55 is properly oriented on the base plate 52 throughout the printing process, the tag 65 will continuously interfere with the beam B from the emitter 61 and prevent its reception by the detector 62. As long as the object remains properly seated on the base plate the detector will never receive the beam. Consequently, the detector will not generate a signal because no beam has been detected. On the other hand, as shown in FIG. 3, when the object is dislocated from its proper position, such as might occur when the first layer is dislodged from the base plate, the tag 65 no longer interferes with the beam B. The detector 62 thus receives the beam and generates a signal. It is important that the tag have an area that is as near to the area of the beam as possible, since the object can be dislodged in any direction. In the example of FIG. 3, the object is rotated so that the tag has moved away from the path of the beam B. However, in another example, the object may shift outward in the y-direction so that the object 55 is closer to the beam. In this example, the bridge element 66 may overlap the path of the beam. However, since the bridge element is thinner than the beam it will not prevent at least a large percentage of the beam from reaching the detector, causing the detector to generate a signal. In the example in which the tag has a height of 0.1-0.11 in., the bridge element can have a height of 0.01-0.02 in. Alternatively, the tag can have a height greater than the beam diameter, with the emitter and detector elevated from the plane of the base plate so that the top of the beam is adjacent the top of the tag. This arrangement eliminates the possibility of the bridge element interfering with any part of the beam B. In the example, the height of the tag can be extended by the height of the bridge element (i.e., 0.01-0.02 in.), and the emitter and detector raised by a like amount relative to the surface of the base plate 52. It is important that the length dimension (y-direction in the example) of the tag is as near to the beam dimension as possible so that even the slightest dislocation of the object 55 will allow some portion of the beam B to be received by the detector 62.

As discussed above, the controller 58 is configured and operable to monitor the components of the 3D printer and to terminate the 3D printing process under certain conditions. In accordance with the present disclosure, the controller 58 monitors the detector 62 to determine whether a signal has been generated by the emitter. As noted above, the detector can be a CCD device corresponding to a plurality of pixels in the area or diameter of the detector. It is contemplated that the detector can be configured to generate a single signal when any or some combination of the pixels receive the optical beam. Thus, even a slight dislocation of the object 55 and tag 65 can expose a single pixel of the detector 62 to the beam B. In some 3D printing operations, a single pixel error may be significant enough to warrant stopping the printing process. In other cases, a single pixel exposure is not significant enough to stop printing. In those cases, the detector can be configured to generate a signal only when a predetermined number of pixels receive the beam. For example, the detector 62 can be configured to generate an error signal only when 25% of the pixels receive the beam. It is understood that the controller 58 can evaluate the signals generated by all of the pixels of the detector and make this determination in lieu of the detector.

The controller is configured to evaluate an error condition in the printing process based on receipt of the signal from the detector 62. As long as the object being printed is properly oriented, no signal is received from the detector. But when the object is dislodged, the beam is detected and a signal is generated by the detector 62 that is received by the controller 58. The controller is thus configured to stop the 3D printing process and generate an alarm or other indication that the printing process has failed. In one embodiment, it is contemplated that the error detection system operates continuously throughout the printing process so that a beam is continuously generated by the emitter 61 and the detector 62 is continuously monitored by the controller for receipt of a detector signal. Alternatively, the error detection system can be operated intermittently, such as prior to the application of a new layer by the nozzle 51. In this case, the controller 58 is configured to activate the emitter and canvas the detector for a limited period after each layer has been completed and before another layer is commenced.

In either case, the error detection system 60 operates until the object 55 has been completed by the 3D printer. When a misalignment is detected, the controller 58 immediately terminates, or at least pauses, the 3D printing process upon receipt of the detector signal. In one embodiment, the printing process may be paused or terminated before any significant deformity of the printed object 55 has occurred. In this case, the object can be restored to its proper orientation on the base plate and the printing operation resumed. Alternatively, or if the deformity is too great, the object can be scrapped before any further printing occurs, thereby reducing waste of material and time.

In one aspect of the disclosure, the translation software used to generate the data set provided to the controller 58 for the 3D printer can be configured to automatically add a model of the tag 65 and the bridge element 66 to the model of the object 55. Alternatively, the software can permit user selection of whether to add the tag and bridge element to the model to be 3D printed. As noted above, the translation software takes the model data generated by the 3D modeling software and generates the data set that is readable by the printer controller. Thus, the translation software determines the path of the 3D printer nozzle (or base plate) in the x- and y-directions. The translation software can thus determine the proper orientation of the model of the tag 65 and bridge element 66 added to the model of the object 55 so that the tag will interfere with the beam from the emitter 61 as the tag is being printed but will not interfere with the beam if the model is dislodged. In the illustrated embodiment, the tag 65 extends in the y-direction, so the translation software is configured to add the model of the tag and bridge element to have the same x-direction coordinate and to extend in the y-direction. As discussed above, the dimensions of the tag 65 are limited to close to the size of the beam B, since any greater dimension would be unnecessary.

Since the translation software determines the location of the tag 65, it can send that information to the printer controller 58 to control the activation of the positioning mechanism 63 to move the emitter and detector 61, 62 to the proper y-direction location aligned with the tag. Prior to commencing the 3D printing operation, the controller 58 can activate the positioning mechanism 63 to move the emitter and detector to the desired y-axis (or x-axis) position. The controller can initiate an alignment check by activating the emitter and determining whether the detector generates a signal in response to receiving the beam from the emitter. The positioning mechanism can be operated to calibrate the alignment between emitter and detector as necessary, prior to commencing the printing operation.

Once the emitter and detector have been positioned, one or both are deactivated since the tag has not yet been formed. The controller 58 begins the 3D printing process, with the initial printed layers including portions of the object 55 as well as portions of the tag 65 and bridge element 66. Once the last layer of the tag 65 has been printed, the controller activates the emitter 61 and detector 62 of the error detection system 60, although in some cases the error detection system can be activated when a predetermined amount of the tag has been printed. The 3D printing continues until the object 55 is completed, or until an error condition is detected as described above.

Figure 4:
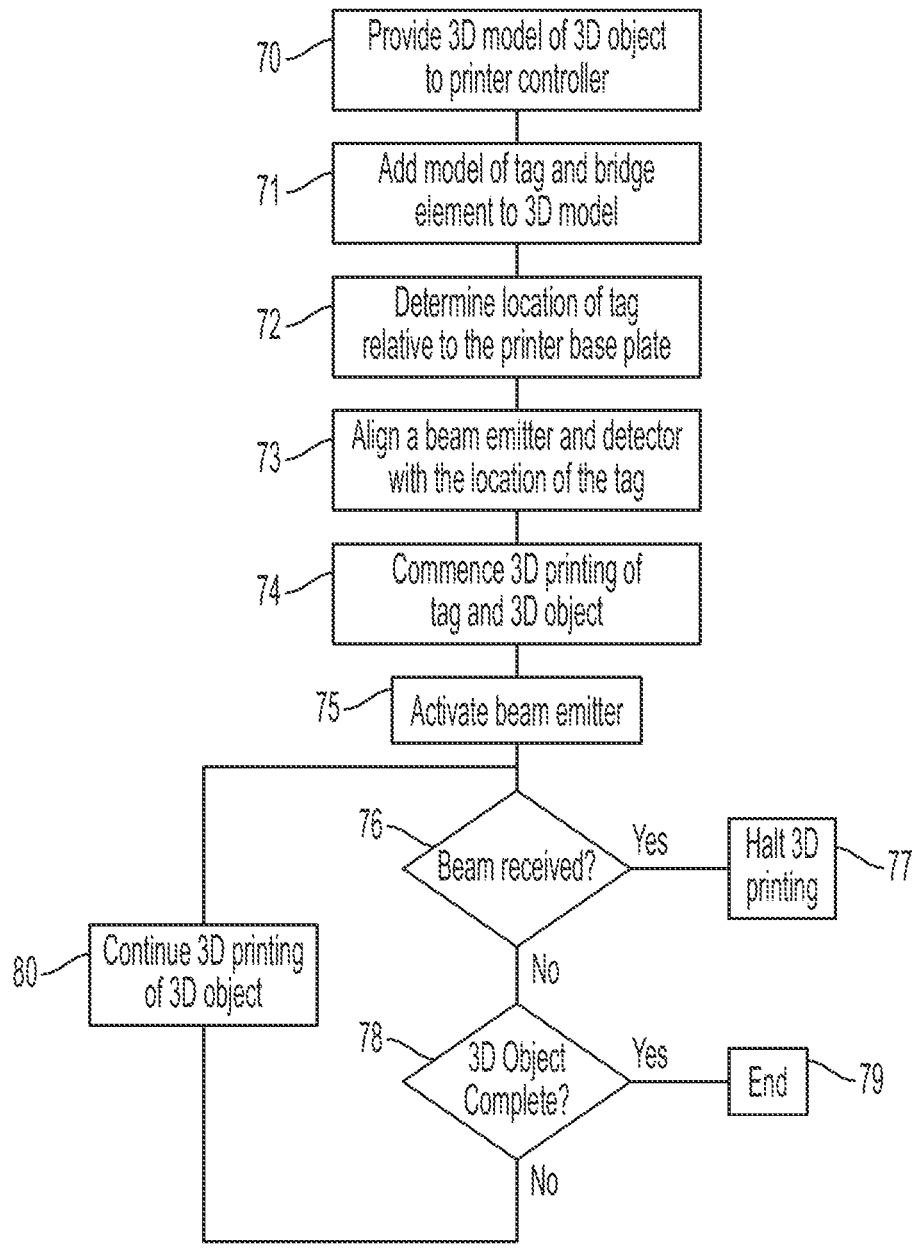
FIG. 4 is a flowchart of steps in a 3D printing process incorporating the error detection feature of the present disclosure.
Figure 5A:
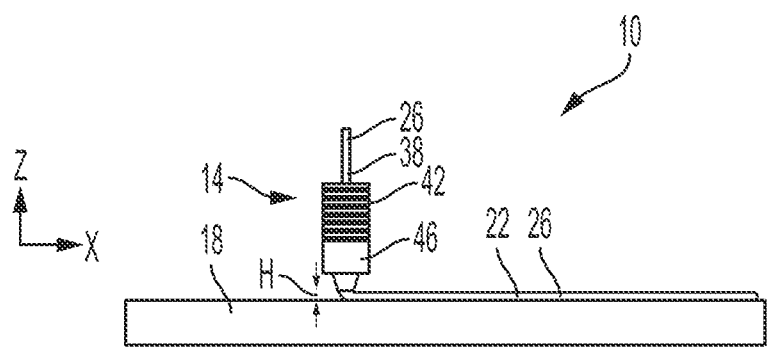
FIGS. 5A-5D are top and side views of an exemplary prior art 3D printer performing portions of a process to form a 3D object.
Figure 5B:
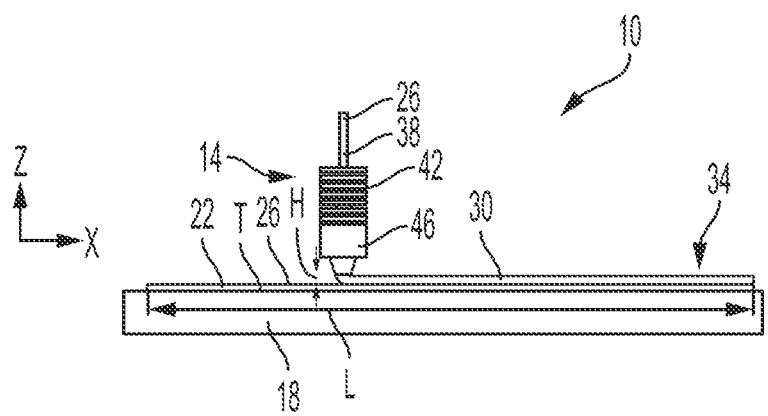
Figure 5C:
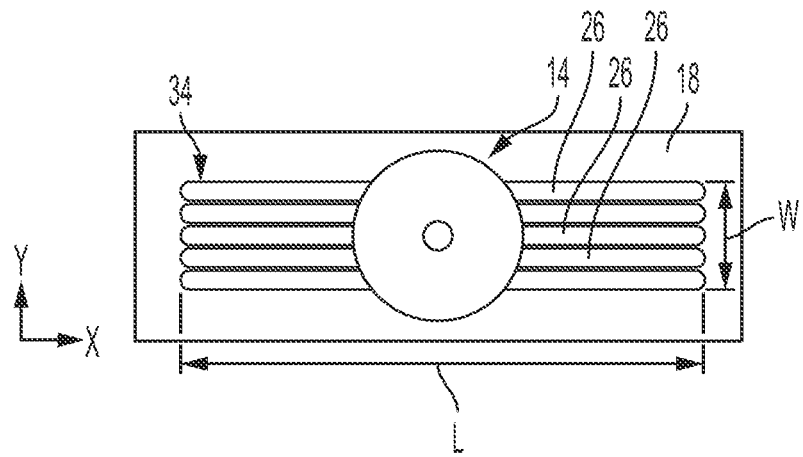
Figure 5D:
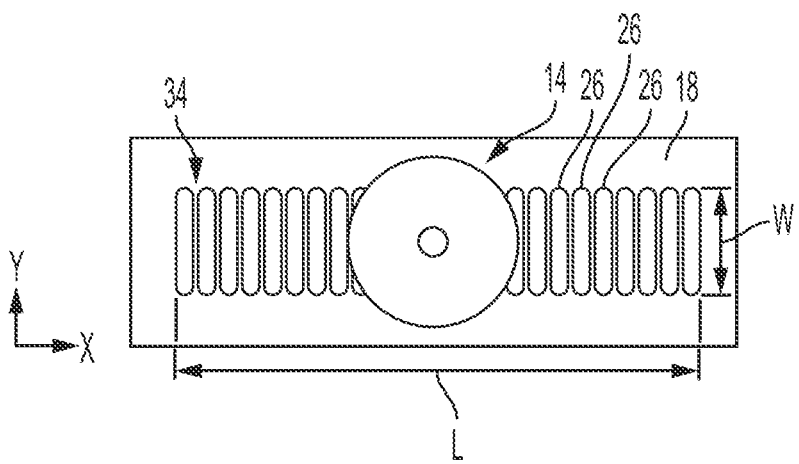

Thus, as illustrated in the exemplary flowchart of FIG. 4, a 3D model of a 3D object to be printed is provided to the printer controller for the 3D printer, in Step 70. In Step 71, a model of the tag 65 and bridge element 66 is added to the 3D model. The location of the tag relative to the base plate, when it is printed, is determined in Step 72 by the controller 58 and this information is used in Step 63 to control the positioning mechanism 63 to align the emitter and detector with the future location of the tag. At this point, the 3D printing can commence in Step 74. The emitter 61 is activated in Step 75, which preferably occurs after the tag 65 has been printed. However, the emitter can be activated to emit the optical beam prior to completion of the tag, as long as the detector 62 is not activated until the tag has been fully formed. As the 3D printing process continues, the controller determines whether the beam has been received by the detector in Step 76, which is indicative of a dislocation of the 3D object. If the beam has been received, then the 3D printing process is halted in Step 77. On the other hand, if the beam has not been received, which is indicative of a proper positioning of the 3D object on the base plate, the controller determines whether the object has been completed in Step 78. If the 3D object is complete the printing process ends in Step 79. Otherwise, the printing process continues in Step 80, with control looping back to the conditional 76 to determine if the optical beam has been received. Steps 76-80 continue as long as the object has not dislocated and until the 3D printing is complete.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A three-dimensional (3D) printer, comprising:
   a base plate;
   a nozzle connectable to a source of molten material and operable to eject the molten material onto the base plate;
   a 3D movement mechanism for moving one or both of the base plate and nozzle relative to the other of the base plate and nozzle in orthogonal x-axis, y-axis and z-axis directions;
   an error detection system configured and operable to generate a signal in response to detecting a dislocation of the 3D object on the base plate, wherein said error detection system includes:
   an emitter for emitting a beam; and
   a detector for detecting the beam,
   wherein the emitter and detector are arranged relative to the base plate so that the emitter and detector are aligned with each other so that the beam emitted by the emitter passes across the base plate and is detectable by the detector; and
   a printer controller operable to control the nozzle and the 3D movement mechanism according to a 3D model received by the printer controller to perform a 3D printing operation to form a 3D object on the base plate, said printer controller receiving said signal from said error detection system and operable to stop the 3D printing operation in response thereto, wherein said printer controller is configured to add a 3D model of a tag to the 3D model received by the printer controller, so that the 3D printing operation forms the tag offset from and connected to the 3D object during the 3D printing operation, wherein the emitter and detector of the error detection system are arranged so that only the tag is interposed between the emitter and detector to intersect the beam; and
   wherein said emitter is configured to emit an optical beam having a beam diameter; and said detector is configured to detect the optical beam, wherein said tag has a dimension in the plane of the optical beam that is substantially equal to said beam diameter.

2. The 3D printer of claim 1, wherein the emitter and the detector are mounted to the base plate.

3. The 3D printer of claim 1, wherein the error detection system further includes a positioning system for positioning the emitter and detector along an axis in the plane of the base plate.

4. The 3D printer of claim 3, wherein the positioning system includes:
   a carriage supporting the emitter and detector in fixed relationship relative to each other along said axis; and
   a motor for translating the carriage relative to the base plate along said axis.

5. The 3D printer of claim 3, wherein the positioning system includes:
   a lead screw disposed on one side of the base plate;
   a motor for rotationally driving the lead screw; and
   a driven nut threaded onto the lead screw, wherein one of the emitter and the detector is mounted to the driven nut.

6. The 3D printer of claim 5, wherein the positioning system includes:
   a second lead screw disposed on a side of the base plate opposite said one side;
   a motor for rotationally driving the second lead screw; and
   a second driven nut threaded onto the second lead screw, wherein the other of the emitter and detector is mounted to the second driven nut.

7. The 3D printer of claim 1, wherein said detector is a charge-coupled device (CCD).

8. The 3D printer of claim 1, wherein the tag is rectangular with sides having a length substantially equal to the beam diameter.

9. The 3D printer of claim 1, wherein the 3D model of the tag includes a bridge element connecting the tag to the 3D object during the 3D printing operation, said bridge element configured so that the bridge element is not interposed between the emitter and detector, wherein the tag is opaque to the beam to prevent transmission of the beam to the detector.

10. The 3D printer of claim 9, wherein;
    the 3D model of the tag and the bridge offsets the tag from the 3D object by 20 mm along an axis in the plane of the base plate; and
    the emitter and detector are aligned with each other along a line that intersects said axis so that the tag is interposed therebetween.

* * * * *